(12) United States Patent
Tsuda (10) Patent No.: US 11,920,555 B2
(45) Date of Patent: Mar. 5, 2024

(54) IMPELLER FOR WIND POWER GENERATION, AND WIND POWER GENERATION SYSTEM

(71) Applicant: Kuninori Tsuda, Tokyo (JP)

(72) Inventor: Kuninori Tsuda, Tokyo (JP)

( * ) Notice: Subject to any disclaimer, the term of this patent is extended or adjusted under 35 U.S.C. 154(b) by 132 days.

(21) Appl. No.: 17/633,785

(22) PCT Filed: Jun. 22, 2020

(86) PCT No.: PCT/JP2020/024472
§ 371 (c)(1),
(2) Date: Feb. 8, 2022

(87) PCT Pub. No.: WO2021/033419
PCT Pub. Date: Feb. 25, 2021

(65) Prior Publication Data
US 2022/0299006 A1    Sep. 22, 2022

(30) Foreign Application Priority Data

Aug. 16, 2019   (JP) ................................. 2019-149476

(51) Int. Cl.
*F03D 1/06*   (2006.01)
*F03D 9/25*   (2016.01)
(Continued)

(52) U.S. Cl.
CPC ............ *F03D 1/0625* (2013.01); *F03D 9/25* (2016.05); *H02K 7/116* (2013.01); *H02K 7/183* (2013.01); *F05B 2220/706* (2013.01)

(58) Field of Classification Search
CPC ........ F03D 1/0625; F03D 9/25; F03D 1/0633; H02K 7/116; H02K 7/183; F05B 2220/706; F05B 2240/301
See application file for complete search history.

(56) References Cited

U.S. PATENT DOCUMENTS

2013/0309095 A1* 11/2013 Brock .................. F03D 1/0633
                                                                    416/226
2020/0049126 A1   2/2020 Tsuda et al.

FOREIGN PATENT DOCUMENTS

JP   11-182405 A      7/1999
JP   2009-197752 A    9/2009
(Continued)

OTHER PUBLICATIONS

International Search Report issued in International Patent Application No. PCT/JP2020/024472, dated Jul. 14, 2020 (with English translation).
(Continued)

*Primary Examiner* — Joseph Ortega
(74) *Attorney, Agent, or Firm* — Greenblum & Bernstein, P.L.C.

(57) ABSTRACT

An impeller for wind power generation includes: a plurality of blades; and a hub which is provided with a rotating shaft at a center and around which the plurality of blades are arranged at substantially equal intervals in a circumferential direction. The blade is formed to extend while widening a width toward an outer periphery of the impeller, a line segment connecting a leading edge and a trailing edge of the blade is inclined at an angle of approximately 10 degrees or more and approximately 20 degrees or less with respect to a plane perpendicular to a rotating shaft of the impeller, and in the plurality of blades, a trailing edge of a blade on a front side in a rotation direction of the impeller and a leading edge of a blade on a rear side in the rotation direction partially overlap each other in a front view of the impeller.

4 Claims, 5 Drawing Sheets

(51) Int. Cl.
    *H02K 7/116*     (2006.01)
    *H02K 7/18*     (2006.01)

(56) References Cited

FOREIGN PATENT DOCUMENTS

| JP | 2009197752 A | * | 9/2009 |
| JP | 2017-115624 A | | 6/2017 |
| JP | 2018-184933 A | | 11/2018 |

OTHER PUBLICATIONS

Written Opinion of the International Searching Authority issued in International Patent Application No. PCT/JP2020/024472, dated Jul. 14, 2020 (with English translation).
International Preliminary Report on Patentability issued in International Patent Application No. PCT/JP2020/024472, dated Feb. 17, 2022 (with English translation).

* cited by examiner

IMPELLER FOR WIND POWER GENERATION, AND WIND POWER GENERATION SYSTEM

TECHNICAL FIELD

The present invention relates to an impeller for wind power generation capable of increasing power generation efficiency and having excellent quietness, and a wind power generation system including the impeller for wind power generation.

BACKGROUND ART

In recent years, there has been an increasing interest in power generation apparatuses using clean energy in consideration of the global environment. One of such power generation apparatuses is a wind power generation apparatus. The wind power generation apparatus is an apparatus that rotates an impeller by wind power to convert rotational energy obtained by rotation of the impeller into electric energy.

Incidentally, it is desired to increase the power generation amount of the wind power generation apparatus due to an increase in power demand and the like. For example, Patent Literature 1 proposes a wind power generation apparatus provided with a wind tunnel for collecting wind on an impeller in order to increase the power generation amount.

CITATION LIST

Patent Literature

Patent Literature 1: JP 11-182405 A

SUMMARY OF INVENTION

Technical Problem

In general, the larger the area of the blade of the impeller that receives wind, and the higher the rotation speed of the impeller, the larger the power generation amount of the wind power generation apparatus tends to increase. In addition, it is known that, in a case where impellers having the same diameter and different numbers of blades are compared, the rotation speed of the impeller increases as the number of blades is smaller. Therefore, a wind power generation apparatus including a three-blade impeller, which is currently the mainstream, is often designed such that the diameter of the blade is long in order to increase the area of the blade. However, when it is attempted to install a plurality of wind power generation apparatuses in a limited area, the installation number of wind power generation apparatuses is reduced as the diameter of the blade increases, and as a result, the power generation amount obtained from the entire area is reduced. Furthermore, the noise problem caused by friction between the blades and air is also one of the reasons why the place where the wind power generation apparatus can be installed is limited. For this reason, there is a demand for an impeller and a wind power generation system capable of efficiently generating power from the entire region by installing a plurality of wind power generation apparatuses in a limited region and having excellent quietness.

The present invention has been made in view of the above problems. That is, an object of the present invention is to provide an impeller and a wind power generation system capable of efficiently generating power from the entire region even if the impeller and the wind power generation system are installed in a limited narrow region. Another object of the present invention is to provide an impeller and a wind power generation system capable of reducing noise generated by rotation of the impeller during wind power generation.

Solution to Problem

In the present invention, the above objects can be achieved by any one of [1] to [4] described below.

[1] An impeller for wind power generation comprising: a plurality of blades; and a hub which is provided with a rotating shaft at a center and around which the plurality of blades are arranged at substantially equal intervals in a circumferential direction, wherein the blade is formed to extend while widening a width toward an outer periphery of the impeller, a line segment connecting a leading edge and a trailing edge of the blade is inclined at an angle of approximately 10 degrees or more and approximately 20 degrees or less with respect to a plane perpendicular to a rotating shaft of the impeller, and in the plurality of blades, a trailing edge of a blade on a front side in a rotation direction of the impeller and a leading edge of a blade on a rear side in the rotation direction partially overlap each other in a front view of the impeller;

[2] The impeller for wind power generation according to [1], wherein the plurality of blades are five blades, and a blade on a front side in a rotation direction of the impeller and a blade on a rear side in the rotation direction do not overlap each other in an outer peripheral portion of the impeller in a front view of the impeller;

[3] The impeller for wind power generation according to [1] or [2], wherein the blade is formed of a plate-like material formed to have a substantially uniform thickness, and a surface on a wind receiving side is a flat surface;

[4] A wind power generation system comprising a wind tunnel formed such that a longitudinal cross section cut along a central axis forms a substantial streamline shape, the impeller according to any one of [1] to [3] disposed in the wind tunnel, and a wind power generation apparatus including at least a power generator that generates power by rotation of the impeller.

Advantageous Effects of Invention

According to the present invention, it is possible to provide the impeller and the wind power generation system capable of efficiently generating power from the entire region even if the impeller and the wind power generation system are installed in a limited narrow region. Further, according to the present invention, it is possible to provide the impeller and the wind power generation system capable of reducing noise generated by rotation of the impeller during wind power generation.

DESCRIPTION OF EMBODIMENTS

Hereinafter, an embodiment of the present invention will be described with reference to the drawings, but the present invention is not limited to the drawings and the embodiment. Further, the present invention is not limited to preferable numerical values and configurations described below.

Figure 1:
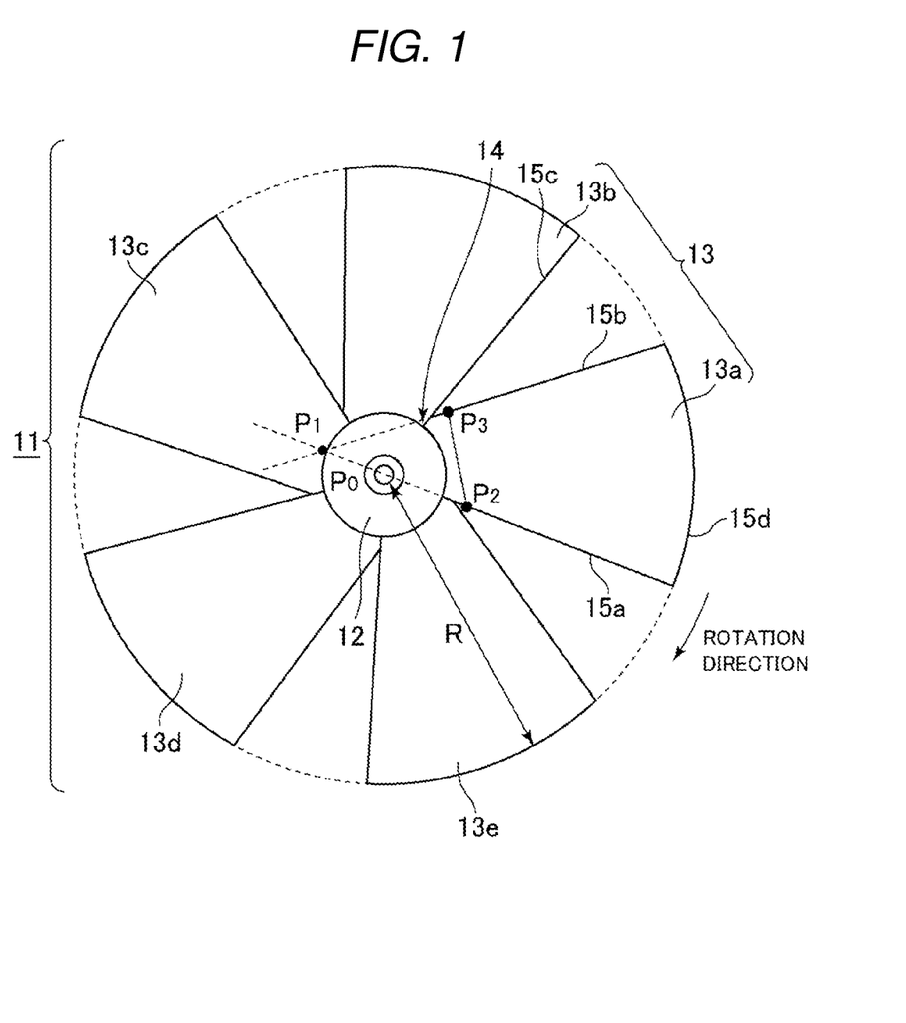
FIG. 1 is an example of a front view of an impeller according to an embodiment of the present invention.
Figure 2:
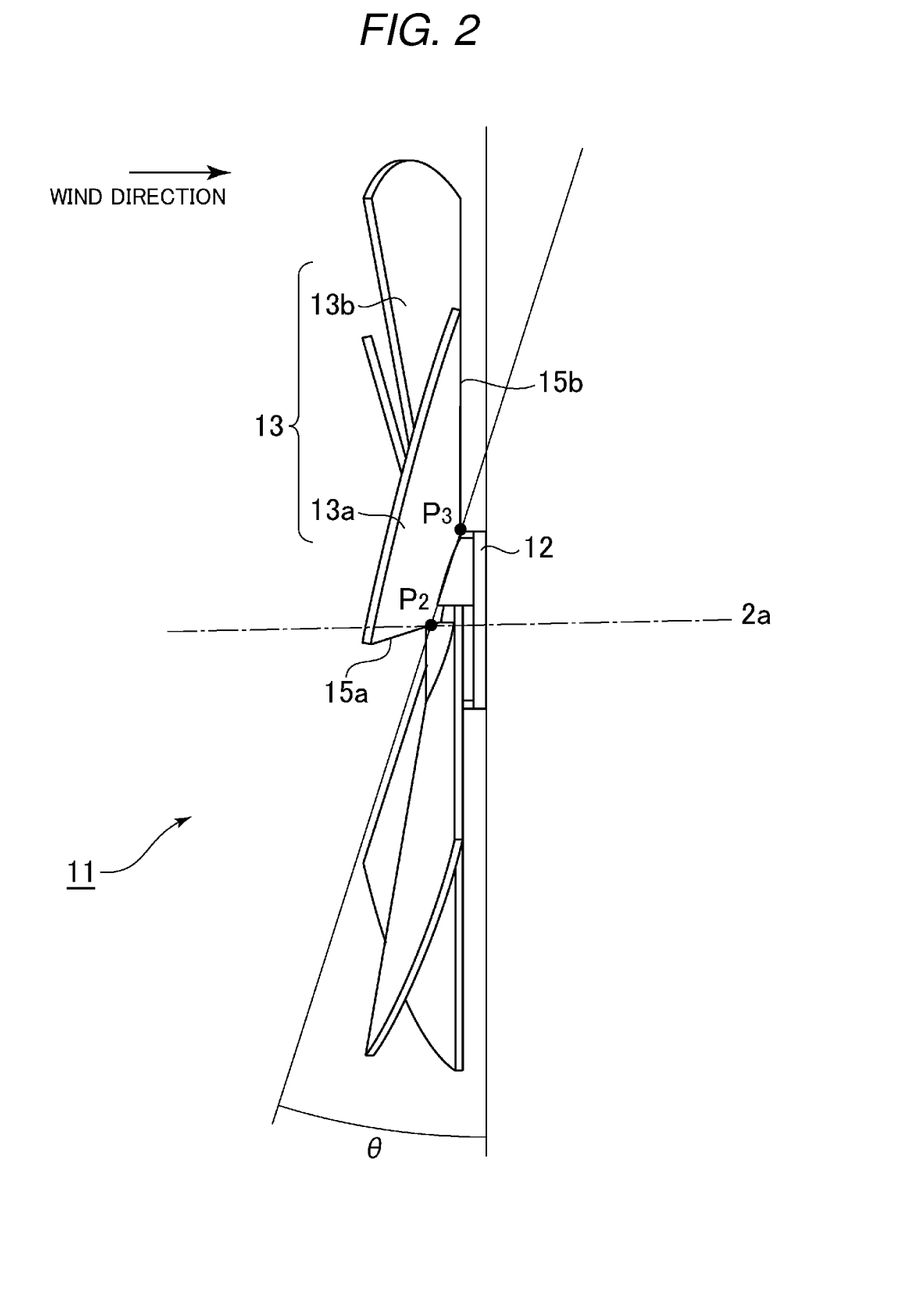
FIG. 2 is an example of a side view of the impeller according to the embodiment of the present invention.

FIG. 1 is an example of a front view of an impeller according to an embodiment of the present invention. FIG. 2 is an example of a side view of the impeller according to the embodiment of the present invention. An impeller 11 illustrated in FIGS. 1 and 2 includes at least a hub 12 and a plurality of blades 13.

As illustrated in FIG. 1, the impeller 11 is formed such that blades 13a to 13e extend from a side surface of the hub 12 toward an outer peripheral direction of the impeller 11 while widening a width of the blades. The blades 13a to 13e are arranged at substantially equal intervals in the circumferential direction of the hub 12 so as to surround the hub 12. The hub 12 is configured such that the center is a rotation center $P_0$ of the impeller 11, and a rotating shaft for transmitting rotational force of the impeller 11 to a power generator can be connected to the rotation center $P_0$.

FIG. 2 is an example of a side view of the impeller according to the embodiment of the present invention. As illustrated in FIGS. 1 and 2, the blades 13 are attached to the hub 12 so as to be inclined such that a rear end edge (trailing edge) is located on a leeward side with respect to a front end edge (leading edge) when viewed from the rotation direction of the blade 13. In addition, the width of each blade 13 has a substantially fan shape in which the width of the end edge in the outer circumferential direction of the impeller 11 is wider than the width in the vicinity of the portion where the blade 13 and the hub 12 are connected.

The number of blades 13 of the impeller 11 is not particularly limited, but is preferably 3 to 5, for example. When the number of blades 13 is less than 3, the amount of wind received by the blades 13 as a whole decreases, and the power generation efficiency decreases. In addition, since the number of blades for transmitting wind energy to the hub is too small, torque necessary for driving the power generator cannot be sufficiently obtained, and the power generation efficiency decreases. On the other hand, when the number of blades 13 is six or more, a vortex of wind generated by friction between the blades 13 and air increases, and noise increases. Although a larger torque is obtained as compared with the case of three to five blades, the rotation speed of the impeller tends to decrease rapidly. Therefore, the efficiency of converting wind power into the rotational force of the impeller 11 is also deteriorated, and thus the power generation efficiency decreases. Furthermore, since the mass of the entire impeller increases, a structural load on the hub 12 and a rotating shaft 2 also increases, which adversely affects the durability of the impeller 11.

The number of blades 13 is particularly preferably five. When the number of blades 13 is five, a larger torque sufficient for driving the power generator can be obtained as compared with the case of four blades. In addition, although the area that receives the wind in each blade is reduced, the air receiving area of the entire impeller can be increased. Therefore, it is possible to convert wind power into rotational force with high efficiency. In order to secure an air receiving area similar to that in a case where the number of blades is five in a configuration in which the number of blades is four or less, it is necessary to design to increase the blade width to increase the mass of the blades or to increase the diameter of the blades. When the blade width is increased to increase the mass of the blade, the structural load on the hub 12 also increases, which adversely affects the durability of the impeller 11. When the diameter of the blades is designed to be increased, the installation number of wind power generation apparatuses is reduced, and as a result, the power generation amount obtained from the entire area is reduced.

When the number of blades 13 is five, high power generation efficiency can be obtained as compared with the case where the number of blades is six or more. When the number of blades is five, the area that receives the wind in each blade can be increased as compared with the case where the number of blades is six or more. In a case where the number of blades is five, on the contrary, even when a space is secured between the blades in order to allow the wind to pass from the front to the rear of the impeller, a sufficient space can be secured as compared with the case of six or more blades. In a case where the space between the two adjacent blades is narrow, the impeller itself blocks the flow of air or causes a vortex of wind generated by friction between the impeller and the air to stay in the place for a long time, so that there is a possibility that the flow of wind flowing in from the front of the impeller is stalled and the rotation efficiency of the impeller is reduced. As a result, the power generation efficiency decreases.

By adopting the configuration in which the number of blades 13 of the impeller 11 is five, it is possible to obtain sufficient torque necessary for power generation, and at the same time, it is possible to perform power generation while maintaining high rotation efficiency without stalling the flow of wind passing through the blades. In addition, since it is possible to suppress generation of a vortex of wind without disturbing the flow of air, noise can be reduced. In addition, since the number of blades is limited to five, it is possible to reduce a load applied by the mass of the entire impeller 11 to the rotating shaft 2, and there is an advantage that the impeller 11 is hardly damaged. Furthermore, the manufacturing cost can be suppressed as compared with the case where the number of blades 13 is six or more.

Next, the inclination angle of each blade 13 will be described with reference to FIGS. 1 and 2. As illustrated in FIG. 2, each of the blades 13 including the blade 13a in the present embodiment is attached to the hub 12 so as to be inclined such that the rear end edge (trailing edge 15b) is located on the leeward side with respect to the front end edge (leading edge 15a) when viewed in the rotation direction of blade 13a. Here, in a plane perpendicular to the rotating shaft 2a, a radius from the rotation center $P_0$ of the impeller 11 to an outer peripheral end edge located at an outermost periphery of the impeller 11 is defined as R, and intersections between a circumference of a circle having a radius of ¼R and the leading edge 15a and the trailing edge 15b of the blade 13a are defined as $P_2$ and $P_3$, respectively. When an inclination angle of a line segment $P_2P_3$ connecting $P_2$ and $P_3$ with respect to a plane perpendicular to the rotating shaft 2a is defined as θ, the inclination angle θ is preferably 10 degrees or more, and more preferably 12 degrees or more. The inclination angle θ is preferably 20 degrees or less, and more preferably 18 degrees or less. When the inclination angle θ is in the range of 14.5 degrees or more and 15.5 degrees or less, the wind power can be most efficiently converted into the rotational force when the blade receives the wind. On the other hand, when the inclination angle θ is larger than 20 degrees, the vibration of the blade when receiving the wind becomes large, and noise increases, and at the same time, air turbulence occurs. In addition, when the inclination angle θ is smaller than 10 degrees, the blade itself becomes a resistance that hinders the flow of the wind, and the wind speed greatly decreases, so that the rotation speed of the blade rapidly decreases and the power generation efficiency also decreases.

In each of the blades 13 including the blade 13a in the present embodiment, the inclination angle θ of the line segment $P_2P_3$ is defined such that the rear end edge (trailing edge 15b) is located on the leeward side with respect to the front end edge (leading edge 15a), but the line segment $P_2P_3$ may be positioned such that the inclination angle θ is reversed by 180 degrees. In this case, the rotation direction of the impeller is opposite to the rotation direction of the impeller 11 in the present embodiment. Further, the positions of the points $P_2$ and $P_3$ in the present embodiment are defined as intersections between the circumference of a circle having a radius of ¼R centered on the rotation center $P_0$ and the leading edge 15a and the trailing edge 15b of the blade 13a, but arbitrary points can be selected as long as the points $P_2$ and $P_3$ are points on the leading edge 15a and the trailing edge 15b of the blade 13a, respectively.

Next, a shape of each blade 13 of the impeller 11 will be described with reference to FIGS. 1 and 3. In each blade 13 of the impeller 11 in the present embodiment, an area of a blade necessary for generating predetermined power is secured by adopting a configuration in which the blade width is gradually increased toward an outer periphery of the impeller 11. In FIG. 1, the width of each blade 13 is formed such that the width of the end edge in the outer circumferential direction of the impeller 11 is wider than the width in the vicinity of the portion where the blade 13 and the hub 12 are connected, and has a substantially fan shape. In addition, the shape of the blade 13 is not particularly limited, but as illustrated in FIG. 1, it is preferable that when the blade 13a is viewed from the front, an intersection $P_1$ of straight lines obtained by extending the leading edge 15a and the trailing edge 15b of the blade 13a belongs to a region opposite to the outer peripheral edge 15d of the blade across the rotation center $P_0$. With such a configuration, even in the vicinity of the portion where the blade 13a and the hub 12 are connected, it is possible to secure a wide area where the blade 13 receives wind. Accordingly, it is possible to increase an area that receives wind as the impeller 11 as a whole and to further increase power generation efficiency.

Figure 3:
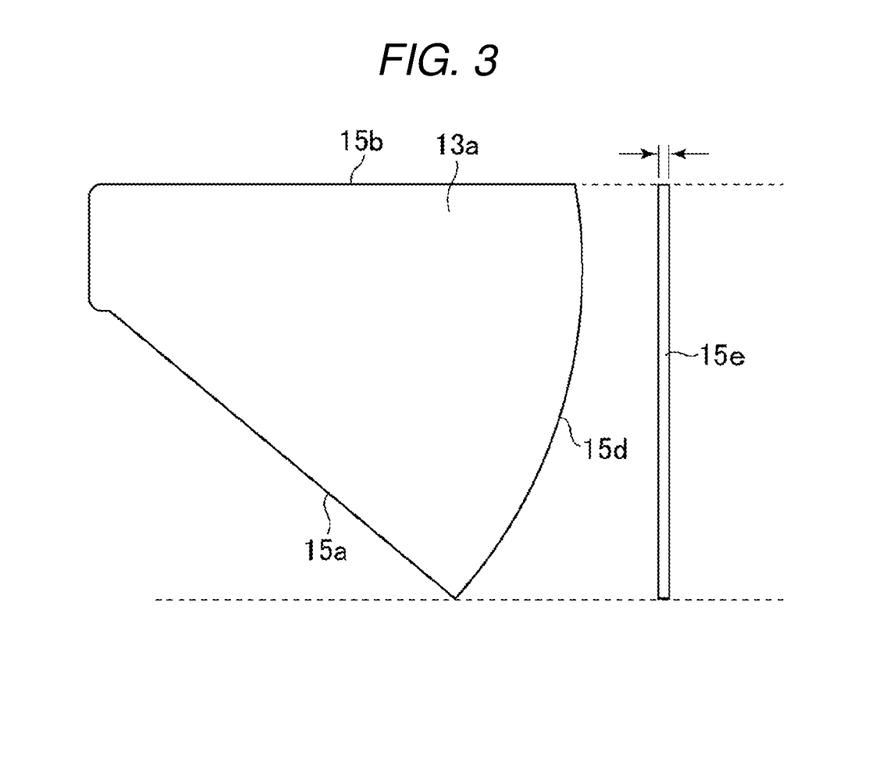
FIG. 3 is an example of a front view and an outer-peripheral-side side view of the blade according to the embodiment of the present invention.

FIG. 3 is an example of a front view and an outer-peripheral-side side view of the blade according to the embodiment of the present invention. As illustrated in FIG. 3, the blade 13a preferably has a single plate shape obtained by processing a thin plate-shaped member into a planar shape with a substantially uniform thickness. That is, when the blade 13a is viewed from the side of the outer peripheral edge 15d of the blade 13a, as illustrated in an outer-peripheral-side side view 15e of the outer peripheral edge 15d, the blade 13a is preferably formed to have a uniform thickness as a whole. In addition, it is preferable that a shape of a portion (region surrounded by the leading edge 15a, the trailing edge 15b, and the outer peripheral edge 15d) that receives wind in the blade 13a be a flat surface. The material of the blade 13a is not particularly limited as long as it is a thin plate-shaped member, but it is preferably FRP because it is easy to process, lightweight, and strong.

Since the material of the blade 13a in the present embodiment is a thin plate-shaped member, air resistance during rotation is small, and disturbance of wind hardly occurs when the wind passes through the blade 13a, so that rotation efficiency of the impeller 11 can be increased. In addition, since the blades 13a to 13e have a plate shape with a substantially uniform thickness over the entire blades, processing at the time of manufacturing is easy and the manufacturing cost of each blade can be suppressed as compared with conventional blades having a streamline shape or a shape curved toward the outer peripheral direction.

Next, two blade 13a and the blade 13b adjacent to each other of the blades 13a to 13e of the impeller 11 will be described with reference to FIG. 1. The impeller 11 is preferably configured such that the blade 13a on the front side in the rotation direction of the impeller 11 and the blade 13b on the rear side in the rotation direction do not overlap each other in an outer peripheral portion of the impeller 11 in a front view of the impeller 11. That is, in the relationship between two adjacent blades, a predetermined space is preferably secured between the trailing edge 15b of the blade 13a and a leading edge 15c of the blade 13b. When the impeller 11 receives wind and rotates, a vortex of wind is generated between the blades 13 due to friction between the blades and the air, and the vortex of wind generated in the blade 13a on the front side in the rotation direction interferes with a rotational motion of the blade 13b coming later, which may cause a decrease in the rotation efficiency of the impeller 11 itself. Therefore, by providing a predetermined space between the blades adjacent to each other, it is easy to release a vortex of wind or air turbulence generated between the blades in the leeward direction, and it is possible to suppress mutual interference between the blades adjacent to each other in the rotation direction of the impeller. In addition, by securing a predetermined space between the blades 13 of the impeller 11, it is possible to prevent the flow of the wind passing through the impeller 11 from being disturbed, the air from staying behind, and the wind from stalling due to a decrease in the amount of the wind flowing into the impeller 11. Therefore, it is possible to increase the rotation efficiency of the impeller 11 as a whole.

On the other hand, if only the space between the blade 13a and the blade 13b adjacent to each other is expanded, the area that receives wind as the impeller 11 as a whole is narrowed, and the efficiency of converting wind power into rotational energy of the impeller is reduced. Therefore, it is preferable that the blade 13a and the blade 13b adjacent to each other are configured such that the trailing edge 15b of the blade 13a located on the front side in the rotation direction of the impeller 11 and the leading edge 15c of the blade 13b located on the rear side in the rotation direction partially overlap each other in a front view of the impeller. By adopting such a configuration, an area where the blades receive wind can be increased as the impeller 11 as a whole, so that wind power can be efficiently converted into rotational energy of the impeller without increasing a diameter of the blade 13.

It is preferable that a region 14 where the trailing edge 15b of the blade 13a of the impeller 11 and the leading edge 15c of the blade 13b overlap each other is a portion close to the hub 12. When a radius from the rotation center $P_0$ of the impeller 11 to an outer peripheral end edge located at an outermost periphery of the impeller 11 in a plane perpendicular to the rotating shaft is defined as R, the region 14 where the two blades are overlapped is preferably included in a region surrounded by a circle having a radius of ½R, and more preferably included in a region surrounded by a circle having a radius of ⅓R. With such a configuration, it is possible to suppress mutual interference between adjacent blades and prevent the wind flowing into the impeller 11 from stalling, and at the same time, it is possible to take a large air receiving area as the impeller 11 as a whole, and thus, it is possible to efficiently convert wind power into rotational energy of the impeller. In addition, with such a configuration, it is possible to efficiently generate power while suppressing generation of a vortex of wind and suppressing noise.

Figure 4:
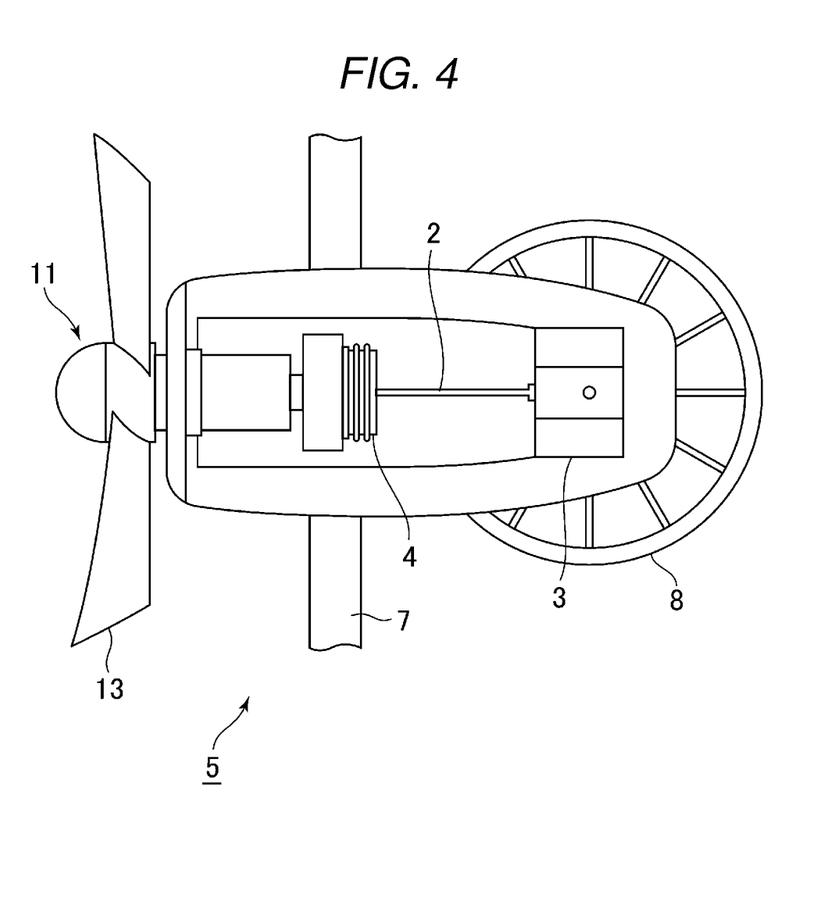
FIG. 4 is an example of a partial cross-sectional view of an upper surface of a wind power generation apparatus according to the embodiment of the present invention.

FIG. 4 is an example of a partial cross-sectional view of an upper surface of a wind power generation apparatus using the impeller 11 according to the embodiment of the present invention. As illustrated in FIG. 4, a wind power generation apparatus 5 using the impeller 11 includes the impeller 11, the rotating shaft 2, an orthogonal gear 3, an epicyclic gear 4, and a power generator 8. The impeller 11 of the present invention is connected to one end of the rotating shaft 2 such that a rotation center of the impeller 11 overlaps a rotation center of the rotating shaft 2. Here, the other end side of the rotating shaft 2 is connected to the orthogonal gear 3 for transmitting the rotational force to the power generator 8. When the impeller 11 receives wind, the rotating shaft 2 rotates together with the impeller 11, and rotational energy is transmitted to the power generator 8. Then, the rotational energy is converted into electric energy in the power generator 8, and is collected to a current collector by a current collection cable or the like connected to the power generator 8.

The epicyclic gear 4 is provided on the rotating shaft 2, and plays a role of generating a large torque necessary and sufficient for power generation even in high-speed rotation by an impeller having a small diameter. With such a configuration, wind power can be efficiently converted into rotational energy of the impeller, and more efficient power generation can be performed.

A torque limiter is connected to the power generator 8, and has a function of decelerating the rotational speed when the load applied to the wind power generation apparatus 5 becomes a predetermined value or more. That is, the power generator 8 has a function of preventing excessive rotation of the rotating shaft 2 and the impeller 11 connected to the rotating shaft 2. When the wind power is strong and the rotating shaft 2 exceeds a predetermined rotation speed, an excessive load is also applied to the power generator 8 connected to the orthogonal gear 3, and there is a tendency that a dynamo provided inside the power generator 8 is likely to be damaged. However, the possibility that the power generator 8 is damaged can be reduced by providing the torque limiter. Further, by preventing excessive rotation, friction between air and the blade 13 can be reduced, and noise can be suppressed. In the present embodiment, the impeller 11 of the present invention is used for the wind power generation apparatus 5 including the torque limiter, but may be used for a power generation apparatus not including the torque limiter.

The wind power generation apparatus 5 using the impeller 11 according to the embodiment of the present invention is preferably installed in a predetermined wind tunnel.

Figure 5:
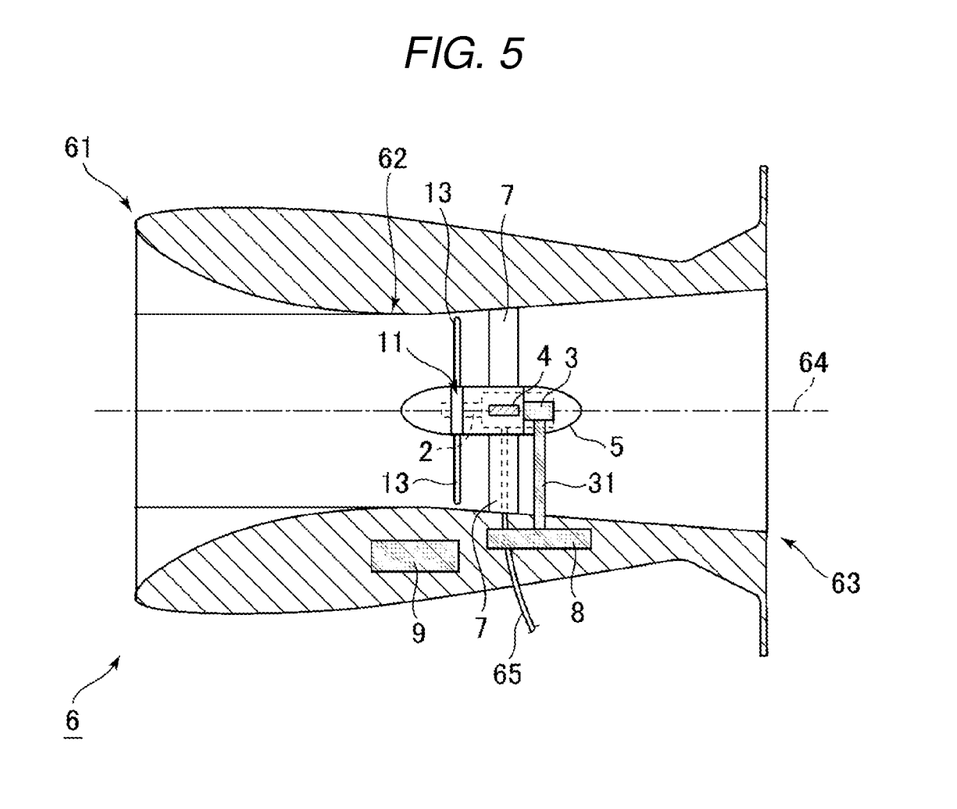
FIG. 5 is an example of a partial cross-sectional view of the wind power generation system according to the embodiment of the present invention.

FIG. 5 is an example of a partial cross-sectional view of the wind power generation apparatus 5 using the impeller 11 according to the embodiment of the present invention. In the present specification, the term "substantial streamline shape" refers to a shape obtained by deforming the shape of the inner peripheral side edge portion in the longitudinal cross section of the wall body of the wind tunnel within the scope of the purpose of increasing the speed of the wind flowing into the inside from an intake port side of the wind tunnel without causing disturbance inside the wind tunnel. The term "substantial streamline shape" also includes a shape obtained by deforming the shape of the outer peripheral side edge portion in the longitudinal cross section of the wall body of the wind tunnel within the scope of the purpose of preventing the generation of a vortex in the outer peripheral surface. As an example of such a modification, there is a case where the shape of the outer peripheral side edge portion in the longitudinal cross section of the wall body of the wind tunnel has a streamline shape in a part from the front end portion to the rear end portion of the wind tunnel. In addition, the "substantial streamline shape" also includes a shape in which the shape of the outer peripheral side edge portion in the longitudinal cross section of the wall body of the wind tunnel is linear.

The wind tunnel 6 includes at least a front end portion 61 forming an intake port, a minimum inner diameter portion 62 in which the inner diameter of the wind tunnel 6 is minimized, and a rear end portion 63 forming an exhaust port. The inner diameter of the wind tunnel 6 gradually decreases from the front end portion 61 to the minimum inner diameter portion 62, and gradually increases from the minimum inner diameter portion 62 to the rear end portion 63. That is, a part of the inner wall of the wind tunnel 6 bulges toward a central axis 64 of the wind tunnel, and the minimum inner diameter portion 62 at which the inner diameter of the wind tunnel is smallest is formed between the intake port and the exhaust port. As described above, since the wind tunnel 6 is configured such that the longitudinal cross section along the central axis 64 forms a substantial streamline shape, it is possible to increase the speed of the wind flowing into the wind tunnel from the intake port of the wind tunnel 6 and to improve the power generation amount and the power generation efficiency. In addition, since the wind inside the wind tunnel increases in speed, it is not necessary to obtain lift by the blade itself of the impeller, and thus sufficient power generation performance is obtained even if the blade does not have a streamline shape or a shape curved toward the outer peripheral direction as in the related art.

The wind power generation apparatus 5 is fixed to an upper portion of a support column 7, and the support column 7 is fixed to a support plate (not illustrated). The support plate is a plate for supporting the wind tunnel 6 and the support column 7, and is embedded in the vicinity of the bottom of the wind tunnel 6 so as to be integrated with the wind tunnel 6. In addition, the support plate includes a leg (not illustrated) provided so as to pass through the bottom of the wind tunnel from the support plate toward the lower side, and fixes the wind tunnel 6 and the wind power generation apparatus 5 by fixing the leg to a predetermined installation surface.

The impeller 11 is provided so as to be located closer to the intake port than the support column 7. With such a configuration, the disturbance of the flow of the wind generated by the support column 7 can be generated at a position sufficiently away from the impeller 11, so that it is possible to suppress a decrease in speed increasing effect in the vicinity of the impeller 11.

When the flow of the wind after passing through the impeller is disturbed by a back flow generated behind the blade 13 or the support column 7, a Karman vortex generated by separation of the wind from the surface of the support column, or the like, a speed component other than the traveling direction is generated in the wind, and the flow of the wind may become slow behind the impeller inside the wind tunnel. When such disturbance of wind occurs, even if the cross-sectional shape of the wind tunnel has a substantial streamline shape, the wind flowing into the wind tunnel 6 from the intake port cannot be sufficiently increased in speed, and there is a possibility that an expected high power generation efficiency cannot be obtained. Therefore, it is preferable to minimize the influence of such disturbance of wind on the power generation efficiency.

The impeller 11 is preferably provided such that a surface that receives wind in the blade 13 is directed toward the front end portion 61 that is the air intake side. With such a configuration, the impeller 11 can efficiently receive the speed-increased wind flowing into the wind tunnel from the intake port, and the power generation amount and the power generation efficiency can be improved.

The impeller 11 is preferably provided inside the wind tunnel 6 such that the rotating shaft 2 of the impeller 11 extends along the central axis 64 of the wind tunnel 6. With such a configuration, the impeller 11 can efficiently receive the speed-increased wind flowing into the wind tunnel from the intake port, and the power generation amount and the power generation efficiency can be improved.

Furthermore, the inner diameter of the minimum inner diameter portion 62 of the wind tunnel 6 is preferably 3R or less, more preferably 2.6R or less, and still more preferably 2.2R or less in a range not to be 2R or less when the rotation radius of the blade 13 of the impeller 11 is denoted by R. With such a configuration, the wind flowing into the wind tunnel from the intake port can be most efficiently multiplied and increased in speed in the vicinity of the impeller 11, and the power generation amount and the power generation efficiency can be improved.

REFERENCE SIGNS LISTS

11 IMPELLER
12 HUB
13 BLADE
2 ROTATING SHAFT
3 ORTHOGONAL GEAR
31 SHAFT
4 EPICYCLIC GEAR
5 WIND POWER GENERATION APPARATUS
6 WIND TUNNEL
61 FRONT END PORTION
62 MINIMUM INNER DIAMETER PORTION
63 REAR END PORTION
64 CENTRAL AXIS
65 CURRENT COLLECTION CABLE
7 SUPPORT COLUMN
8 POWER GENERATOR
9 TORQUE LIMITER

The invention claimed is:

1. An impeller for wind power generation comprising:
a plurality of blades; and
a hub which is provided with a rotating shaft at a center and around which the plurality of blades are arranged at substantially equal intervals in a circumferential direction, wherein
the blade is formed to extend while widening a width toward an outer periphery of the impeller,
a line segment connecting a leading edge and a trailing edge of the blade is inclined at an angle of approximately 10 degrees or more and approximately 20 degrees or less with respect to a plane perpendicular to a rotating shaft of the impeller,
in the plurality of blades, a trailing edge of a blade on a front side in a rotation direction of the impeller and a leading edge of a blade on a rear side in the rotation direction partially overlap each other in a front view of the impeller, and
a length of a line segment connecting an intersection of straight lines obtained by extending the leading edge and the trailing edge of the blade and an intersection of the leading edge and an outer peripheral edge of the blade is different from a length of a line segment connecting the intersection of the straight lines obtained by extending the leading edge and the trailing edge of the blade and an intersection of the trailing edge and the outer peripheral edge of the blade.

2. The impeller for wind power generation according to claim 1, wherein
the plurality of blades are five blades, and
a blade on a front side in a rotation direction of the impeller and a blade on a rear side in the rotation direction do not overlap each other in an outer peripheral portion of the impeller in a front view of the impeller.

3. The impeller for wind power generation according to claim 1, wherein
the blade is formed of a plate-like material formed to have a substantially uniform thickness, and a surface on a wind receiving side is a flat surface.

4. A wind power generation system comprising a wind tunnel formed such that a longitudinal cross section cut along a central axis forms a substantial streamline shape, the impeller according to claim 1 disposed in the wind tunnel, and a wind power generation apparatus including at least a power generator that generates power by rotation of the impeller.

* * * * *